US007427950B2

(12) United States Patent
Eslinger et al.

(10) Patent No.: US 7,427,950 B2
(45) Date of Patent: Sep. 23, 2008

(54) METHOD FOR INCREASING THE RELIABILITY OF POSITION INFORMATION WHEN TRANSITIONING FROM A REGIONAL, WIDE-AREA, OR GLOBAL CARRIER-PHASE DIFFERENTIAL NAVIGATION (WADGPS) TO A LOCAL REAL-TIME KINEMATIC (RTK) NAVIGATION SYSTEM

(75) Inventors: Daniel J. Eslinger, Redondo Beach, CA (US); Jing Sun, Torrance, CA (US); Richard T. Sharpe, Torrance, CA (US); Frederick W. Nelson, Waukee, IA (US); Terence D. Pickett, Urbandale, IA (US); Ronald R. Hatch, Wilmington, CA (US)

(73) Assignee: Navcom Technology, Inc., Torrance, CA (US)

( * ) Notice: Subject to any disclaimer, the term of this patent is extended or adjusted under 35 U.S.C. 154(b) by 178 days.

(21) Appl. No.: 11/457,745

(22) Filed: Jul. 14, 2006

(65) Prior Publication Data

US 2007/0085737 A1   Apr. 19, 2007

Related U.S. Application Data

(63) Continuation-in-part of application No. 11/345,124, filed on Jan. 31, 2006, which is a continuation-in-part of application No. 10/757,340, filed on Jan. 13, 2004, now Pat. No. 7,119,741.

(51) Int. Cl.
 *G01S 5/14* (2006.01)
(52) U.S. Cl. .............................. 342/357.03; 342/357.04
(58) Field of Classification Search ............ 342/357.03, 342/357.04, 357.08
See application file for complete search history.

(56) References Cited

U.S. PATENT DOCUMENTS 5,359,332 A   10/1994   Allison .................... 342/457

(Continued)

FOREIGN PATENT DOCUMENTS

WO   WO 99/23505 A1   5/1999

OTHER PUBLICATIONS

Bona, P., "Precision, Cross Correlation, and Time Correlation of GPS Phase and Code Observations," GPS Solutions, vol. 4, No. 2. pp. 3-13 (2000).

*Primary Examiner*—Thomas H. Tarcza
*Assistant Examiner*—Fred H. Mull
(74) *Attorney, Agent, or Firm*—Morgan, Lewis & Bockius LLP

(57) ABSTRACT

The present invention includes a method for a combined use of a local positioning system, a local RTK system and a regional, wide-area, or global differential carrier-phase positioning system (WADGPS) in which disadvantages associated with the local positioning system, the RTK and the WADGPS navigation techniques when used separately are avoided. The method includes determining a first position of the object based on information from the WADGPS, and determining a second position of the object based on position information from a local positioning/RTK positioning system. Thereafter, position determined by the WADGPS and the position determined by the local positioning/RTK positioning system are compared. The WADGPS position is used for navigating the object when the WADGPS position and local positioning/position differ by more than a predefined threshold, and using the local positioning/RTK position for navigating the object when the WADGPS position and local positioning/RTK position differ by less than the predefined threshold.

22 Claims, 8 Drawing Sheets

U.S. PATENT DOCUMENTS

| | | | | |
|---|---|---|---|---|
| 5,935,194 | A | 8/1999 | Talbot et al. | 701/214 |
| 6,040,798 | A | 3/2000 | Kinal et al. | 342/357.01 |
| 6,127,968 | A | 10/2000 | Lu | 342/357.03 |
| 6,469,663 | B1 | 10/2002 | Whitehead et al. | 342/357.03 |
| 6,531,981 | B1 * | 3/2003 | Fuller et al. | 342/357.03 |
| 6,753,810 | B1 | 6/2004 | Yang et al. | 342/357.14 |
| 6,792,380 | B2 | 9/2004 | Toda | 702/151 |
| 2003/0011511 | A1 | 1/2003 | King et al. | 342/357.02 |
| 2005/0024263 | A1 | 2/2005 | Sharpe et al. | 714/746 |
| 2005/0151683 | A1 * | 7/2005 | Sharpe et al. | 342/357.03 |
| 2005/0248485 | A1 * | 11/2005 | Hatch et al. | 342/357.12 |

OTHER PUBLICATIONS

Hatch, R., "Instantaneous Ambiguity Resolution," presented at KIS Symposium 1990, Banff, Canada, Sep. 11, 1990.

Hatch, R., "The Synergism of GPS Code and Carrier Measurements," Magnavox Government and Industrial Electronics Company, Jan. 1982.

Hwang, P.Y.C., "Kinematic GPS for Differential Positioning: Resolving Integer Ambiguities on the Fly," Navigation: Journal of the Institute of Navigation, vol. 38, No. 1, pp. 1-15, Spring 1991.

Lee, H.K., et al., "Design and Analysis of DGPS Filter with Consistent Error Covariance Information," SatNav 2003, 6th Int'l Symposium on Satellite Navigation Technology Including Mobile Positioning & Location Services, Melbourne, Australia, Jul. 22-25, 2003.

Lee, H.K., et al., "Design of Kinematic DGPS Filters with Consistent Error Covariance Information," Radar, Sonar and Navigation, IEEE Proceedings, vol. 151, Issue 6, pp. 382-388, Dec. 10, 2004.

Satirapod, D., et al., "A Simplified MINQUE Procedure for the Estimation of Variance-Covariance Components of GPS Observables," Survey Review, vol. 36, No. 286, pp. 582-590, 2002.

Sharpe, Tenny, et al., "Exploiting the Synergies between RTK and Wide Area dGPS Systems", presentation from the Institute of Navigation, 16th International Technical Meeting, Portland, Oregon, Sep. 2003.

Walsh, D., "Real Time Ambiguity Resolution While on the Move," Proceedings of the Institute of Navigation GPS-92, Washington, DC, Sep. 18, 1992, pp. 473-481.

Yang, Y., "Tightly Integrated Attitude Determination Methods for Low-Cost Inertial Navigation: Two-Antenna GPS and GPS/Magnetometer," Dissertation submitted to University of California, Riverside, Jun. 2001.

Search Report for International Patent Application No. PCT/US2004/042374, International Filing Date Dec. 15, 2004.

"Report on overseas travel", Sep. 2003, Portland, Oregon, ION 2003 Reports.doc, specifically p. 12, "bullet" item 5.

International Search Report for International Application No. PCT/US2007/013814, dated Feb. 22, 2008.

Van Norden, et al., "Concept for Military Surveys to IHO Standards Without Shore Stations Using the Real-Time Gipsy (RTG) Global Positioning System (GPS)," Oceans 2005, Proceedings of MTS/IEEE, Washington DC, Sep. 18-23, 2005, 7 pages.

* cited by examiner

METHOD FOR INCREASING THE RELIABILITY OF POSITION INFORMATION WHEN TRANSITIONING FROM A REGIONAL, WIDE-AREA, OR GLOBAL CARRIER-PHASE DIFFERENTIAL NAVIGATION (WADGPS) TO A LOCAL REAL-TIME KINEMATIC (RTK) NAVIGATION SYSTEM

CROSS-REFERENCE TO RELATED CASES

This application is a continuation-in-part of Ser. No. 11/345,124, filed on Jan. 31, 2006, which is a continuation-in-part of Ser. No. 10/757,340, filed on Jan. 13, 2004, now U.S. Pat. No. 7,119,741, both of which are herein incorporated by reference.

TECHNICAL FIELD

The present invention relates generally to technologies associated with positioning and navigation using satellites, and more particularly to resolving carrier floating ambiguity in a regional, wide-area, or global carrier-phase positioning and/or navigation system.

BACKGROUND OF THE INVENTION

The global positioning system (GPS) uses satellites in space to locate objects on earth. With GPS, signals from the satellites arrive at a GPS receiver and are used to determine the position of the GPS receiver. Currently, two types of GPS measurements corresponding to each correlator channel with a locked GPS satellite signal are available for civilian GPS receivers. The two types of GPS measurements are pseudorange, and integrated carrier phase for two carrier signals, L1 and L2, with frequencies of 1.5754 GHz and 1.2276 GHz, or wavelengths of 0.1903 m and 0.2442 m, respectively. The pseudorange measurement (or code measurement) is a basic GPS observable that all types of GPS receivers can make. It utilizes the C/A or P codes modulated onto the carrier signals. The measurement records the apparent time taken for the relevant code to travel from the satellite to the receiver, i.e., the time the signal arrives at the receiver according to the receiver clock minus the time the signal left the satellite according to the satellite clock. The carrier phase measurement is obtained by integrating a reconstructed carrier of the signal as it arrives at the receiver. Thus, the carrier phase measurement is also a measure of a transit time difference as determined by the time the signal left the satellite according to the satellite clock and the time it arrives at the receiver according to the receiver clock. However, because an initial number of whole cycles in transit between the satellite and the receiver when the receiver starts tracking the carrier phase of the signal is usually not known, the transit time difference may be in error by multiple carrier cycles, i.e., there is a whole-cycle ambiguity in the carrier phase measurement.

With the GPS measurements available, the range or distance between a GPS receiver and each of a multitude of satellites is calculated by multiplying a signal's travel time by the speed of light. These ranges are usually referred to as pseudoranges (false ranges) because the receiver clock generally has a significant time error which causes a common bias in the measured range. This common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. With standalone GPS navigation, where a user with a GPS receiver obtains code and/or carrier-phase ranges with respect to a plurality of satellites in view, without consulting with any reference station, the user is very limited in ways to reduce the errors or noises in the ranges.

To eliminate or reduce these errors, differential operations are typically used in GPS applications. Differential GPS (DGPS) operations typically involve a base reference GPS receiver, a user (or navigation) GPS receiver, and a communication link between the user and reference receivers. The reference receiver is placed at a known location and the known position is used to generate corrections associated with some or all of the above error factors. The corrections are supplied to the user receiver and the user receiver then uses the corrections to appropriately correct its computed position. The corrections can be in the form of corrections to the reference receiver position determined at the reference site or in the form of corrections to the specific GPS satellite clock and/or orbit. Differential operations using carrier-phase measurements are often referred to as real-time kinematic (RTK) positioning/navigation operations.

The fundamental concept of Differential GPS (DGPS) is to take advantage of the spatial and temporal correlations of the errors inherent in the GPS measurements to cancel the noise factors in the pseudorange and/or carrier phase measurements resulting from these error factors. However, while the GPS satellite clock timing error, which appears as a bias on the pseudorange or carrier phase measurement, is perfectly correlated between the reference receiver and the user receiver, most of the other error factors are either not correlated or the correlation diminishes in wide-area applications, i.e., when the distance between the reference and user receivers becomes large.

To overcome the inaccuracy of the DGPS system in wide-area applications, various regional, wide-area, or global DGPS (hereafter referred to as wide-area DGPS or WADGPS) techniques have been developed. The WADGPS includes a network of multiple reference stations in communication with a computational center or hub. Error corrections are computed at the hub based upon the known locations of the reference stations and the measurements taken by them. The computed error corrections are then transmitted to users via communication link such as satellite, phone, or radio. By using multiple reference stations, WADGPS provides more accurate estimates of the error corrections.

Thus, a number of different techniques have been developed to obtain high-accuracy differential navigation using the GPS carrier-phase measurements. The RTK technique has a typical accuracy of about one-centimeter. In order to obtain that accuracy, however, the whole-cycle ambiguity in the differential carrier-phase measurements must be determined. When the distance between the user receiver and the reference receiver (baseline distance) is short, the RTK technique is highly advantageous because in this case, the whole-cycle ambiguity can be resolved not only accurately but also quickly. On the other hand, when the baseline distance is more than a few tens of kilometers, it may become impossible to determine the whole-cycle ambiguity and the normal RTK accuracy cannot be achieved. Another limitation of the RTK technique is that it requires a local radio link to be maintained between the reference receiver and the navigation receiver.

The WADGPS techniques that employ a carrier-phase differential method can also achieve very high navigation accuracy. The WADGPS differential techniques are also characterized by reliable long distance low-frequency communication links or by reliable satellite communication links. Thus, corrections can generally be communicated to navigation receivers without significant interruption. However, the WADGPS techniques usually treat the whole-cycle ambiguities as a real-valued (non-integer) variable and solve for a "floating ambiguity," which is usually very poorly defined until measurement data covering a time interval of significant satellite geometry change have been obtained. Thus, in a WADGPS application, a time interval as long as one or two hours is often required to solve for the "floating ambiguity" in order to yield an accuracy of less than 10 centimeters in the navigated position.

Accurate positioning (<1 cm) may also be obtained using a local positioning system. Conventional local positioning systems using active or passive components include acoustic and laser ranging systems, for example, based on a time of flight for signals and/or a Doppler frequency shift. Acoustic systems typically use landmarks and/or transponder beacons to measure range within a network of devices, some of which are fixed to form the local coordinate system. Unfortunately, because of the properties of sound propagation through air, acoustic systems can only measure range to accuracies of a centimeter or more, and only over relatively short distances. Local positioning systems based on lasers utilize measurements of both the angle and range between a device and one or more reflective objects, such as prisms, to triangulate or trilateralate the position of the device. An effective operation range of local positioning systems based on lasers is also typically restricted to relatively short distances (on the order of 1000-10,000 m).

SUMMARY OF THE INVENTION

The present application includes a method for combining the use of the RTK and the WADGPS navigation techniques so that the weaknesses of each technique can be complemented by the strengths of the other technique. The primary disadvantage of the WADGPS technique is that the navigation receiver takes a long elapsed time (often more than an hour) to determine the floating ambiguity values, which are required to convert the carrier-phase measurements into accurate range measurements. The primary disadvantages of the RTK technique are that it requires a real-time (normally line of site) data link between a user GPS receiver and a reference GPS receiver and that the whole-cycle ambiguity can only be determined when the separation distance between reference GPS receiver and user GPS receiver is relatively short.

These separate disadvantages can be removed by using the method for combining the use of the RTK and the WADGPS navigation techniques according to one embodiment of the present invention. The method includes using a known position of a user receiver to initialize the floating ambiguity values in a WADGPS system. When the user receiver has been stationary, the known position of the user receiver may be a surveyed position or a position obtained from a prior operation. When the user receiver is moving, the known location may be obtained using an RTK system.

Thus, in a combined operation, when the communication link for the local positioning system and/or the RTK navigation is available, the position, velocity and time (PVT) outputs of the user receiver can be obtained using the local positioning system and/or the RTK system, while the WADGPS system runs in the background and its outputs are constantly initialized to agree with the outputs from the RTK system. When the communication link for the local positioning system is lost, the PVT outputs of the user receiver can be obtained using the RTK system and/or the WADGPS system, which has been initialized while the local positioning system was operating. When the communication link for the RTK navigation is lost, or when the user receiver wanders too far away from the reference station in the RTK system, the PVT outputs of the user receiver can be obtained using the WADGPS system, which has been initialized while the RTK was operating. Such initialization avoids the normal 15 minute to two hour "pull-in" time required to solve for the floating ambiguity values when the position of the user GPS receiver is not known. This provides very accurate PVT solutions from the WADGPS system while the local positioning system and/or the RTK system is unavailable or inaccurate, and makes the WADGPS technique more practical for real-time high-accuracy positioning and navigation purposes.

DESCRIPTION OF THE INVENTION

Figure 1:
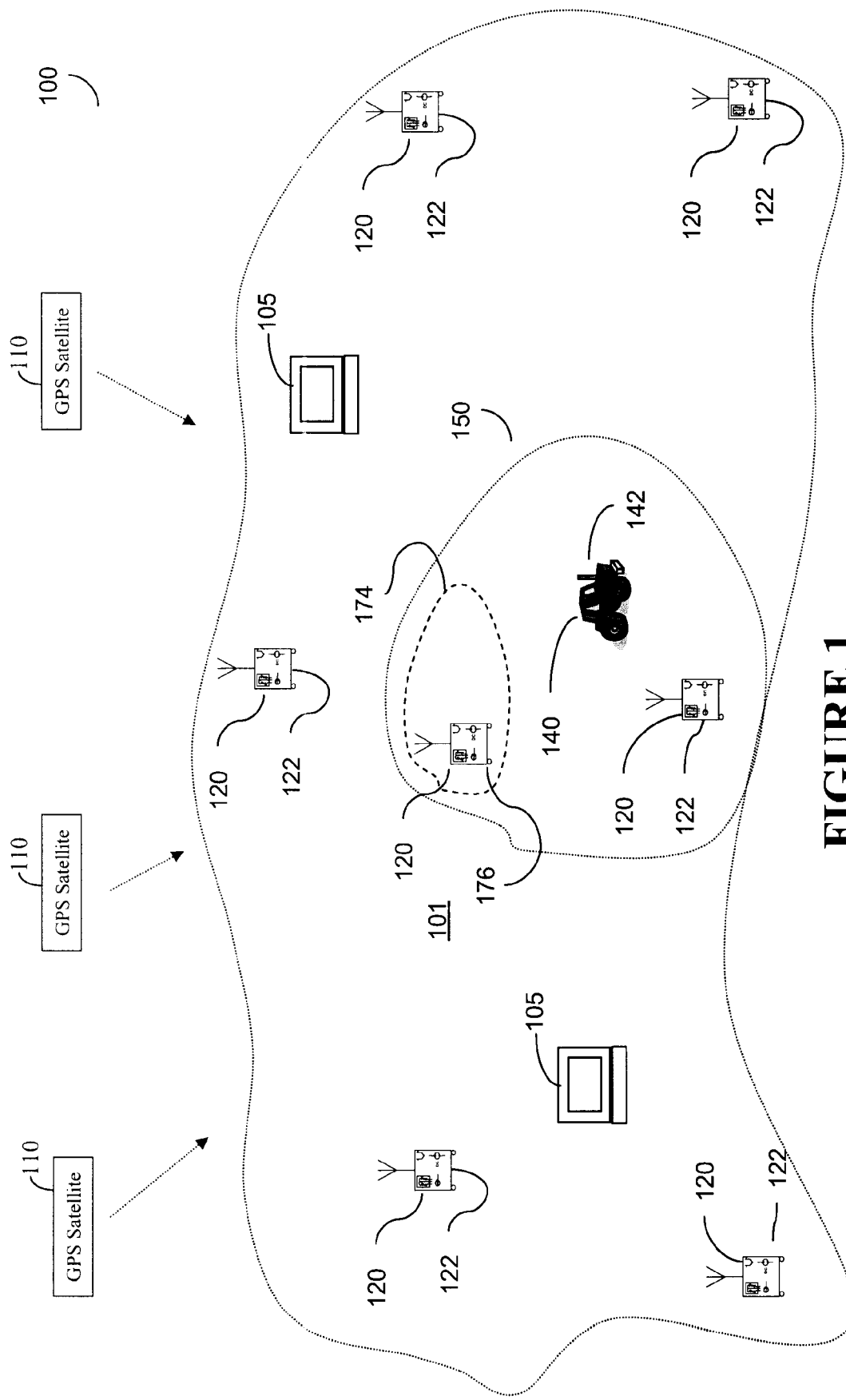
FIG. 1 is a block diagram of a combination of a WADGPS system, a local positioning system, and a local RTK system according to one embodiment of the present invention.

FIG. 1 illustrates a wide-area or global differential GPS (WADGPS) system 100 according to one embodiment of the present invention. As shown in FIG. 1, the WADGPS system 100 includes a network of reference stations 120 each having a GPS receiver 122, and one or more processing hubs 105. The reference stations 120 continuously provide raw GPS observables to the hub 105 for processing. These observables include GPS code and carrier phase measurements, ephemerides, and other information obtained according to signals received from a plurality of satellites 110 at the reference stations 120. The reference stations 120 are placed at known locations across a wide area 101, such as a continent, for a wide-area DGPS system, or across the globe for a global DGPS network. The hubs 105 are facilities at which the GPS observables are processed and DGPS corrections are computed. If multiple independent hubs are provided, it is preferred that they are geographically separated and operate in parallel.

The WADGPS system 100 may be utilized by one or more users (or user devices or objects) 140 each having a user GPS receiver 142 for positioning and/or navigation purposes. In one embodiment of the present invention, the user 140 is associated with a nearby reference station 120 through a RTK radio link such that the user receiver 142 and the nearby reference station 120 forms a local RTK system 150. In some embodiments, the user 140 may also be associated with a local positioning system 174 having one or more landmarks 176. The one or more landmarks 176 may be active or passive. The one or more landmarks 176 may each have a GPS receiver 122.

System 100 further includes conventional data links (not shown) for providing reliable transport mechanisms for the GPS observables to be sent from the reference stations 120 to the hubs 105 and for the computed corrections to be broadcast from the hubs 105 to the reference stations 120 and the users 140. A continental WADGPS system usually has about 3 to 10 reference receivers and a global WADGPS system usually has about 20 to 100 reference receivers feeding data to the hubs 105. In one embodiment of the present invention, the GPS observables are sent from the reference stations 120 to the hubs 105 via the Internet, and computed corrections are sent also via the Internet from the hubs to one or more land stations (not shown) to be uplinked to one more satellites (not shown), which then broadcast the computed corrections for receipt by the reference stations 120 and the user receiver 142.

Figure 2:
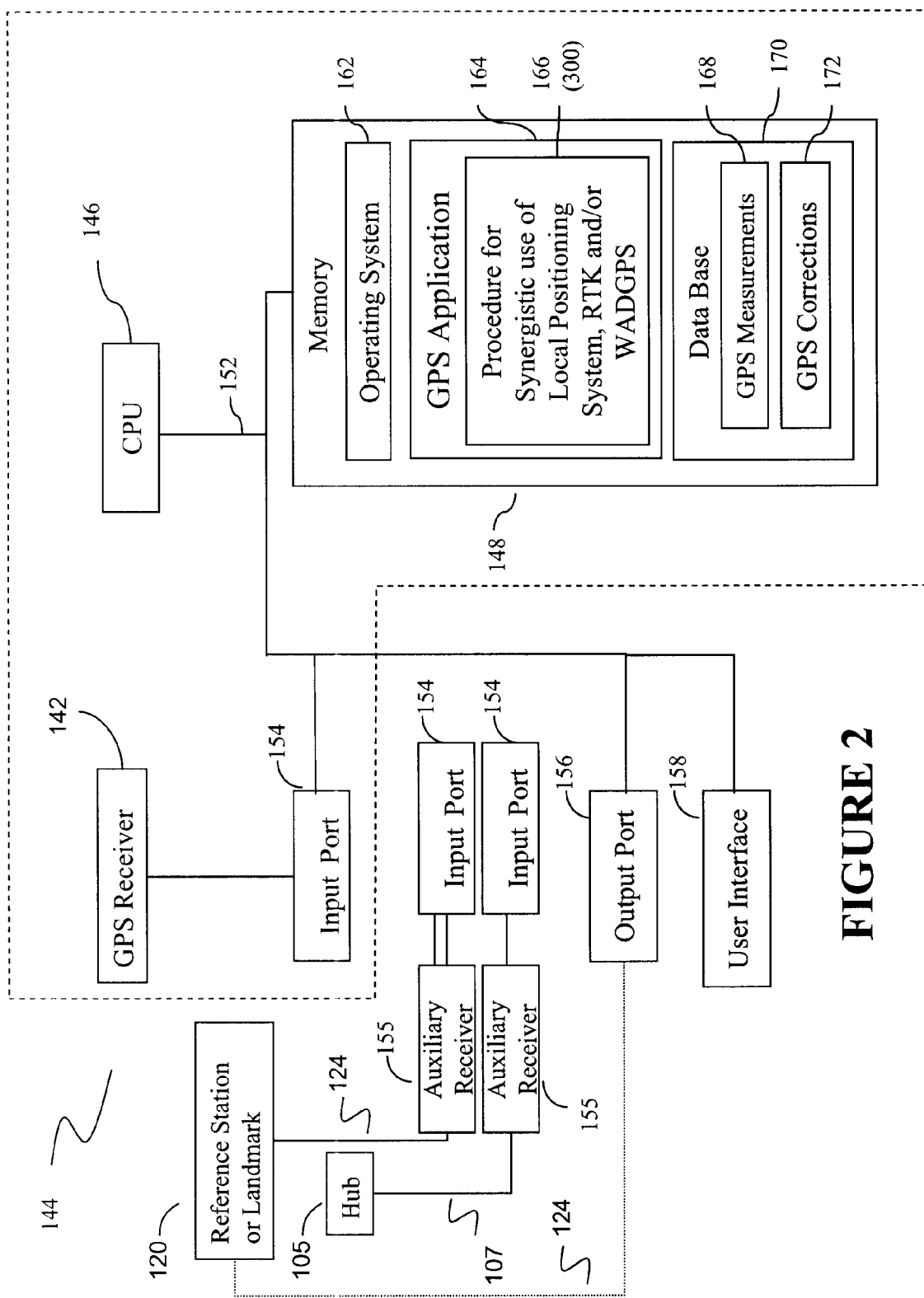
FIG. 2 is a block diagram of a computer system coupled to a user GPS receiver.

In one embodiment of the present invention, the user or object 140 is also equipped with a computer system 144 coupled to the user GPS receiver 142. As shown in FIG. 2, computer system 144 includes a central processing unit (CPU) 146, memory 148, one or more input ports 154, one or more auxiliary receivers 155, one or more output ports 156, and (optionally) a user interface 158, coupled to each other by one or more communication buses 152. The memory 148 may include high-speed random access memory and may include nonvolatile mass storage, such as one or more magnetic disk storage devices or flash memory devices.

The memory 148 preferably stores an operating system 162, GPS application procedures 164, and a database 170. The GPS application procedures 164 may include procedures 166 for carrying out a method 300 for combining the use of the local positioning system 174, the local RTK system 150, and/or the WADGPS system 160, as described in more detail below. The operating system 162 and application programs and procedures 164 stored in memory 148 are for execution by the CPU 146 of the computer system 144. The memory 148 preferably also stores data structures used during execution of the GPS application procedures 164, including GPS pseudorange and carrier-phase measurements 168, GPS corrections 172 received from the hubs, as well as other data structures discussed in this document.

The input ports 154 are for receiving data from the GPS receiver 142, and at least one auxiliary receiver 155 for receiving information from the reference station or landmark 120 in the local positioning system 174 or the local RTK system 150 via a radio link 124, and for receiving GPS corrections and other information from the hubs 105 via a satellite link 107. The output port 156 is used for outputting data to the reference station or landmark 120 via the radio link 124 or acoustic or laser devices (not shown). In one embodiment of the present invention, the CPU 146 and the memory 148 of the computer system 144 are integrated with the GPS receiver 142 into a single device, within a single housing, as shown in FIG. 2. However, such integration is not required to carry out the methods of the present invention.

Therefore, the user or object 140 may engage in three different modes of operation either simultaneously or at different times. The user or object 140 may operate in a WADGPS mode in which the user or object 140 positions itself or navigates using the WADGPS system 100, in a RTK mode in which the user or object 140 positions itself or navigates using the local RTK system 150, and/or in a local positioning mode in which the user or object 140 positions itself or navigates using the local positioning system 174. When the user or object 140 is close to the one or more landmarks 176 with which it may be associated and a communication link between the user or object 140 and the one or more landmarks 176 can be maintained, the user can use the one or more landmarks 176 to position itself with respect to the one or more landmarks 176. When the user or object 140 is close to the reference station 120 with which it is associated and the radio link between the user or object 140 and the reference station 120 can be maintained, the user can use the local RTK system 150 to position itself with respect to the reference station 120. The local positioning system 174 and the local RTK system 150 are more advantageous than the WADGPS system 100 in that they are more accurate and that the whole-cycle integer ambiguity can be quickly resolved, as explained in the following.

Using the local RTK system 150, when measurements are taken with respect to n satellites 110 in view of the reference GPS receiver 122 and the associated user GPS receiver 142, the measurements can be used to solve for the position of the user or object 140 according to the following equation in array format:

$$(\nabla\Phi+N)\lambda = Hx + n_\phi \tag{1}$$

where $\nabla\Phi = [\nabla\phi_1\ \nabla\phi_2\ \ldots\ \nabla\phi_n]^T$ is a carrier phase measurement vector formed by the differential carrier phase measurement with respect to each of the n satellites 110, $N = [N_1\ N_2\ \ldots\ N_n]^T$ is an integer ambiguity vector formed by the differential integer ambiguity associated with each of the differential carrier phase measurements in the carrier phase measurement vector, $H = [h_1\ h_2\ \ldots\ h_n]^T$ is a measurement sensitivity matrix formed by the unit vectors from the user or object 140 to the n satellites 110, x is a real unknown state vector (or real vector) including a position vector from the reference station 120 to the user or object 140 in the local RTK system 150, and $n_\phi = [n_{\phi_1}\ n_{\phi_2}\ \ldots\ n_{\phi_n}]^T$ is a measurement noise vector (or phase range residual vector) formed by the differential carrier phase noise with respect to each of the n satellites 110.

To solve for the real vector x using Equation (1), the integer ambiguity vector N needs to be resolved. Many different methods have been developed to resolve the integer ambiguity values included in the integer ambiguity vector N and these methods typically use a search process to find a combination of integer ambiguity values that satisfy certain criteria, such as a minimum norm of a measurement residual vector $\Delta_\Phi$, $$\Delta_\Phi = (\nabla\Phi + \tilde{N})\lambda - H\hat{x} \tag{2}$$

where $\Delta_\Phi$ is a phase range residual vector corresponding to a candidate integer ambiguity vector $\tilde{N}$ including the combination of integer ambiguity values, and $\hat{x}$ is a least squares solution of Equation (1), $$\hat{x} = [H^T H]^{-1} H^T (\nabla\Phi + N)\lambda \tag{b 3}$$

or, $$\hat{x} = [H^T R H]^{-1} H^T R^{-1} (\nabla\Phi + N)\lambda \tag{4}$$

where $$R = \begin{bmatrix} \sigma_1^2 & \cdots & 0 \\ \vdots & \ddots & \vdots \\ 0 & & \sigma_n^2 \end{bmatrix} \tag{5}$$

is a measurement covariance matrix formed by $\sigma_i$, which is a standard deviation of the differential carrier phase noise $n_{\phi_i}$, calculated using conventional methods. An example of the methods for calculating $\sigma_i$ can be found in "*Precision, Cross Correlation, and Time Correlation of GPS Phase and Code Observations,*" by Peter Bona, GPS Solutions, Vol. 4, No. 2, Fall 2000, p. 3-13, or in "*Tightly Integrated Attitude Determination Methods for Low-Cost Inertial Navigation: Two-Antenna GPS and GPS/Magnetometer,*" by Yang, Y., Ph.D. Dissertation, Dept. of Electrical Engineering, University of California, Riverside, Calif. June 2001, both hereby incorporated by reference.

Other examples of the search methods can be found in "*Instantaneous Ambiguity Resolution,*" by Hatch, R., in the Proceedings of the KIS Symposium 1990, Banff, Canada, which is incorporated herein by reference, and in commonly owned patent application for "*Fast Ambiguity Resolution for Real Time Kinematic Survey and Navigation,*" patent application Ser. No. 10/338,264, issued as U.S. Pat. No. 6,753,810, which is also incorporated herein by reference.

With the integer ambiguity resolved, the position, velocity and time (PVT) of the user receiver 142 can be accurately computed as solutions of the local RTK system 150.

Using the local positioning system 174, the position, velocity and time (PVT) of the user receiver 142 can be accurately computed as solutions of the local positioning system 174. For example, range and angular information relative to the one or more landmarks may be determined using a time of flight of signals and/or Doppler frequency shifts. Additional discussion of determining range and angular information in a local positioning system is provided in U.S. Publication No. 2005-0270228, entitled "*Improved Radar System for Local Positioning,*" filed on Apr. 11, 2005, the contents of which are herewith incorporated by reference. In addition, measurements taken with respect to n satellites 110 in view of the GPS receiver 120 in one or more of the one or more landmarks 176 and the associated user GPS receiver 142, the measurements can be used to solve for the position of the user or object 140 according to the preceding equations.

In spite of their many advantages, the local positioning system 174 and/or the local RTK system 150 may not be available to the user or object 140 at all times because the user may move to a location that is too far from the one or more landmarks 176 and/or the reference station 120, or is out of site of the one or more landmarks 176 and/or the reference station 120 so that the communication link and/or the radio link 124 between the user or object 140 and the landmark and/or reference station cannot be maintained. In these situations, ionospheric induced error cannot be satisfactorily removed by taking into account the difference between measurements at the user or object 140 and at the landmark 176 and/or reference station 120. This error affects the above search process for the integer ambiguity vector because it causes measurement residuals included in the measurement residual vector $\Delta_\Phi$ to increase.

Therefore, in situations where the local positioning system 174 and the local RTK system 150 is not available or has lost its accuracy due to a large separation between the user GPS receiver and the landmark and reference station, the user may need to operate in the WADGPS mode in which a different approach to resolving integer ambiguity is used. Using the WADGPS system 100, each whole-cycle ambiguity is estimated as a real-valued (non-integer) variable. This practice is often referred to as determining a "floating ambiguity" value. One method for determining the "floating ambiguity" value involves the formation of refraction corrected code and carrier-phase measurements based on raw GPS measurements taken at the user or object 140, the scaling of the carrier-phase measurements to the same units as the code measurements, and the subtraction of each scaled carrier-phase measurement from the corresponding code measurement to obtain an offset value. In one embodiment of the present invention, the refraction-corrected code measurement, designated as $P_{RC}$, is formed as follows:

$$P_{RC} = \frac{f_1^2}{(f_1^2 - f_2^2)}P_1 - \frac{f_2^2}{(f_1^2 - f_2^2)}P_2 \cong P_1 - 1.5457(P_1 - P_2). \quad (6)$$

where $P_1$ and $P_2$ are the raw pseudorange code measurements on the L1 and L2 frequencies $f_1$ and $f_2$, respectively, at a particular measurement epoch. The refraction-corrected carrier-phase measurement, designated as $L_{RC}$, is formed similarly as follows:

$$L_{RC} = \frac{f_1^2}{(f_1^2 - f_2^2)}L_1 - \frac{f_2^2}{(f_1^2 - f_2^2)}L_2 \cong L_1 - 1.5457(L_1 - L_2), \quad (7)$$

where $L_1$ and $L_2$ are the carrier-phase measurements scaled by the wavelengths of the L1 and L2 signals, respectively, and each includes an approximate whole-cycle ambiguity value that has been added to cause the scaled carrier-phase measurement to be close to the same value as the corresponding code measurement. Thus, $$L_1 = (\phi_1 + N_1)\lambda_1, \quad (8)$$

$$L_2 = (\phi_2 + N_2)\lambda_2, \quad (9)$$

where $\phi_1$ and $\phi_2$ are the raw carrier phase measurement on the L1 and L2 frequencies, respectively, at the same measurement epoch, and the whole-cycle values of $N_1$ and $N_2$ have been initialized at the start of carrier-phase tracking by the user or object 140 to give values that are within one carrier wavelength of the corresponding code measurements so as to keep the differences between the scaled carrier-phase measurements and the corresponding code measurements small. From the form of equation (7), it is noted that the refraction corrected carrier-phase measurement includes a whole-cycle ambiguity with a wavelength $\lambda$ determined by the sum of $f_1$ and $f_2$ (which is about 2.803 GHz), so that $\lambda$ is approximately 0.1070 meters (i.e.), $c/(f_1+f_2)$.

Because the ionospheric effects have been removed from both the code and carrier-phase measurements according to Equations (6)-(9) and the effects of satellite clock and orbit errors on the pseudorange and carrier-phase measurements are the same, the values of $P_{RC}$ and $L_{RC}$ obtained in step 310 should be almost identical except for the possible whole-cycle ambiguity associated with the carrier-phase measurement $L_{RC}$ and the higher multipath noise in the code measurement $P_{RC}$. This allows the resolution of the whole-cycle ambiguity in $L_{RC}$ by smoothing an offset ($O = P_{RC} - L_{RC}$) between the refraction corrected code measurement and the refraction corrected carrier-phase measurement across a series of measurement epochs so that the offset becomes an increasingly accurate estimate of the "floating ambiguity." The smoothed offset value can be further adjusted by using post-fix measurement residuals to provide an additional carrier-phase measurement adjustment such that the adjusted measurement residuals are near zero.

In one embodiment of the present invention, the offset is smoothed by taking an expanding average of the offset as follows:

$$O_i = O_{i-1} + (P_{RC}{}^i - L_{RC}{}^i - O_{i-1})/\eta, \quad (10)$$

where i=1, 2, 3, . . . , is used to designate a measurement epoch, and the value of η is a confidence value that increases as $O_i$ becomes a more accurate estimate of the floating ambiguity value. In one embodiment of the present invention, η is equal to i until a maximum value of averaging is attained. For example, if the carrier-phase measurement is assumed to have only $\frac{1}{100}^{th}$ of the noise of the code measurement, the value of "η" would be limited to be less than 100 squared or 10,000. Equation (9) can thus be recursively computed until a predetermined accuracy of the floating ambiguity value is reached.

With the smoothed offset $O_i$, a smoothed refraction-corrected code measurement, S, can be obtained by adding the refraction corrected carrier-phase measurement for the current measurement epoch to the smoothed offset, so that $$S_i = O_i + L_i. \quad (11)$$

which has the accuracy of the carrier-phase measurement but without the associated ambiguities.

The above process as described in association with Equations (6)-(11) is performed for each of a plurality of satellites in view of the user GPS receiver 142. With the smoothed refraction-corrected code measurement available for each of the plurality of satellites in view of the user GPS receiver 142, the pseudoranges to these satellites can be obtained. These pseudoranges are adjusted with the WADGPS corrections received from the hubs 105 and are used in a weighted least squares fix to calculate the state vector x. This way, the position, velocity and time (PVT) of the user GPS receiver 142 can be computed as WADGPS solutions for the PVT of the user GPS receiver 142.

Other examples of the methods to obtained the smoothed, refraction corrected offsets can be found in "*The Synergism of Code and Carrier Measurements,*" by Hatch, R. in the Proceedings of the Third International Geodetic Symposium on Satellite Doppler Positioning, DMA, NOS, Las Cruces, N.M., New Mexico State University, Vol. II, pp. 1213-1232, which is incorporated herein by reference, and in commonly owned patent application for a "*Method for Generating Clock Corrections for a Wide-Area or Global Differential GPS System,*" U.S. Publication No. US-2005-0024263, which is also incorporated herein by reference.

It is also possible to solve for the "floating ambiguity" values as separate states in a least-squares or Kalman filter solution. When the ambiguities are included as states, an estimate value for each floating ambiguity value is adjusted according to a variance so that it becomes increasingly accurate as the geometry of the system changes due to satellite motion. Thus, this technique also yields an increasingly accurate estimate over time. See Patrick H. C. Hwang's paper in *Navigation* Vol. 38, No. 1, Spring 1991, titled "*Kinematic GPS for Differential Positioning: Resolving Integer Ambiguities on the Fly,*" which is incorporated herein by reference.

There are many combinations and variations of the above techniques which can be used to estimate the "floating ambiguity" values. However, all of them involve processing data over a significant time interval. The time interval can often be as long as one or two hours before one can be confident that the "floating ambiguity" is accurate enough to yield an accuracy of less than 10 centimeters in the navigated position of the user 140. To shorten the time interval for obtaining the "floating ambiguity" values, the WADGPS system can be initialized as described below using a known location of the user GPS receiver 142.

Figure 3A:
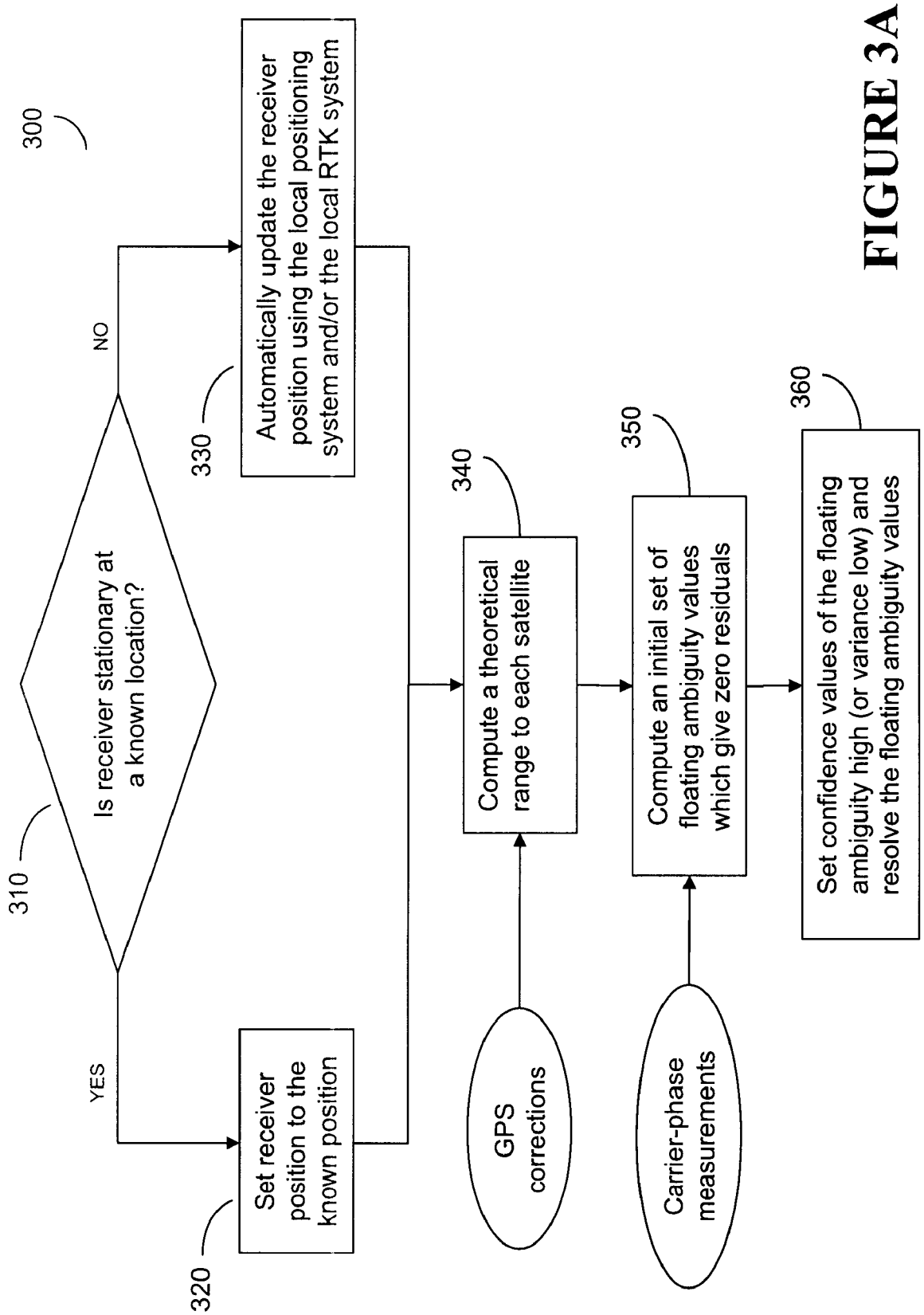
FIG. 3A is a flowchart illustrating a method for combining the use of the WADGPS system, the local RTK system, and/or the local positioning system.

FIG. 3A illustrates a method 300 for initializing the WADGPS system 100. As shown in FIG. 3, method 300 includes a step 310 in which it is determined whether the user is stationary at a known location. This can be done according to user input or via some conventional mechanism that allows the computer 144 to determine whether the user receiver 142 has been stationary. If the position of the user receiver 142 is accurately known, that position can be used to compute the floating ambiguity values without the assistance of the local positioning system 174 and/or the local RTK system 150, as explained in more detail below. A surveyed position of the user GPS receiver 142 could be used as the known position, or in some environments, the position may be known simply because the user or object 140 has been stationary and the user position has already been determined during a prior operation.

In response to the determination that the user is stationary at a known location, method 300 proceeds to a step 320 in which the user receiver position is set to the known location. Otherwise, method 300 proceeds to a step 330 in which the local positioning system 174 and/or the local RTK system 150 are enabled to automatically update the user location using the method discussed above.

Method 300 further includes a step 340 in which the user receiver location, whether it is determined in step 320 or step 330, is used to compute a set of theoretical ranges to the satellites 110. This may involve computing the positions of the satellites 110 based on the broadcast ephemeredes from the WADGPS system 100 and adjusting those positions by the orbital corrections broadcast by the WADGPS system 100. Given both the user receiver position and the satellite positions in Cartesian coordinates, the theoretical range from the user 140 to each satellite 110 can be computed as follows:

$$r = \sqrt{(x_s - x_u)^2 + (y_s - y_u)^2 + (z_s - z_u)^2} \quad (11)$$

where subscript s designates the satellite coordinate and subscript u designates the user or object receiver coordinate.

Method 300 further includes a step 350 in which the initial floating ambiguity value, α, corresponding to each satellite is calculated by subtracting from the computed theoretical range the range obtained from the refraction-corrected carrier-phase measurement with respect to the same satellite so that, $$\alpha = r - L_{RC}{}^0 \quad (12)$$

where $L_{RC}{}^0$ represents the refraction-corrected carrier-phase measurement computed according to Equation (7) at a beginning measurement epoch.

Method 300 further includes a step 360 in which the floating ambiguity values are resolved by adding the initial floating ambiguity values to the corresponding refraction-corrected carrier-phase measurements in subsequent measurement epochs, i.e., $$L_{RC}{}^i = L_{RC}{}^i + \alpha,$$

and by treating the floating ambiguity values as well known so that the confidence is set to high (or the variance is set to low). In practice, step 360 is accomplished by using a small value of gain to adjust the floating ambiguity values in a process for determining the floating ambiguity values. For example, if the floating ambiguity values are determined by smoothing the offset between the refraction-corrected code measurement and the refraction-corrected carrier-phase measurement according to Equation (9), a small gain means treating the floating ambiguity value as if a large number of offset values have been used in computing it, so that $\eta=i+$(a large number). If the ambiguity value is determined in a Kalman filter process, a small gain is achieved by setting the variance of the ambiguity state to a small value.

Thus, by using the known location of a stationary user receiver 142, by using the local positioning system 174 and/or by using the local RTK system 150 to initialize the floating ambiguity values, a normal fifteen minute to two hours of "pull-in" time required to solve for the floating ambiguity values when the user receiver position is not known is avoided. This can greatly speed up the process for resolving carrier-phase ambiguities in the WADGPS system 100, making the WADGPS system 100 more suitable for real-time positioning and/or navigation purposes.

In order to use the local positioning system 174 and/or the local RTK system 150 to update the user receiver position in the method 300, the position of the one or more landmarks 176 in the local positioning system 174 and/or the position of the reference station 120 in the local RTK system 150 may be determined accurately in the WADGPS system 100. A conventional local positioning system or local RTK system can be used in a relative sense, meaning that the position of the user receiver 142 can be determined relative to the one or more landmarks and/or the reference receiver. This way, accurate relative positions of the user GPS receiver 142 can be obtained even though the absolute coordinates of the one or more landmarks and/or reference station may or may not be particularly accurate and coordinate data other than the normal GPS data are used to position the landmark and/or the reference station. For the combined use of the local position system 174, the RTK system 150, and/or the WADGPS system 100, however, an absolute position of the one or more landmarks 176 in the local positioning system 174 and the reference receiver 120 in the RTK system 150 need to be determined. If an incorrect position is used for the one or more landmarks 176 in the local positioning system 174 or the reference station 120 in the local RTK system 150, it will cause the floating ambiguity values computed as described above to be incorrect. This will lead to a slow drift of the computed position of the user receiver 142 as the floating ambiguity values are slowly adjusted to the correct value during subsequent WADGPS processing.

In one embodiment of the present invention, a mean position of the one or more landmarks 176 in the local positioning system 174 and/or a mean position of the reference station 120 in the RTK system 150 may be determined based on hours of positioning data from the WADGPS system 100 for increased reliability. In an alternative embodiment, a computer system in the one or more landmarks 176 and/or at the reference station 120 accepts an operator input value for its position and provides the position to the user 140. This allows the relative local positioning and/or RTK positioning to commence immediately using that reference position. At the same time, a more accurate position of the one or more landmarks 176 and/or the reference station 120 may be determined by the WADGPS system 100 and is transmitted to the one or more landmarks 176 and/or the reference station 120. This more accurate position or an offset between the operator input position and the more accurate position of the one or more landmarks 176 and/or the reference station 120 determined by the WADGPS system 100 may then be transmitted at a relatively low rate to the user 140.

Figure 3B:
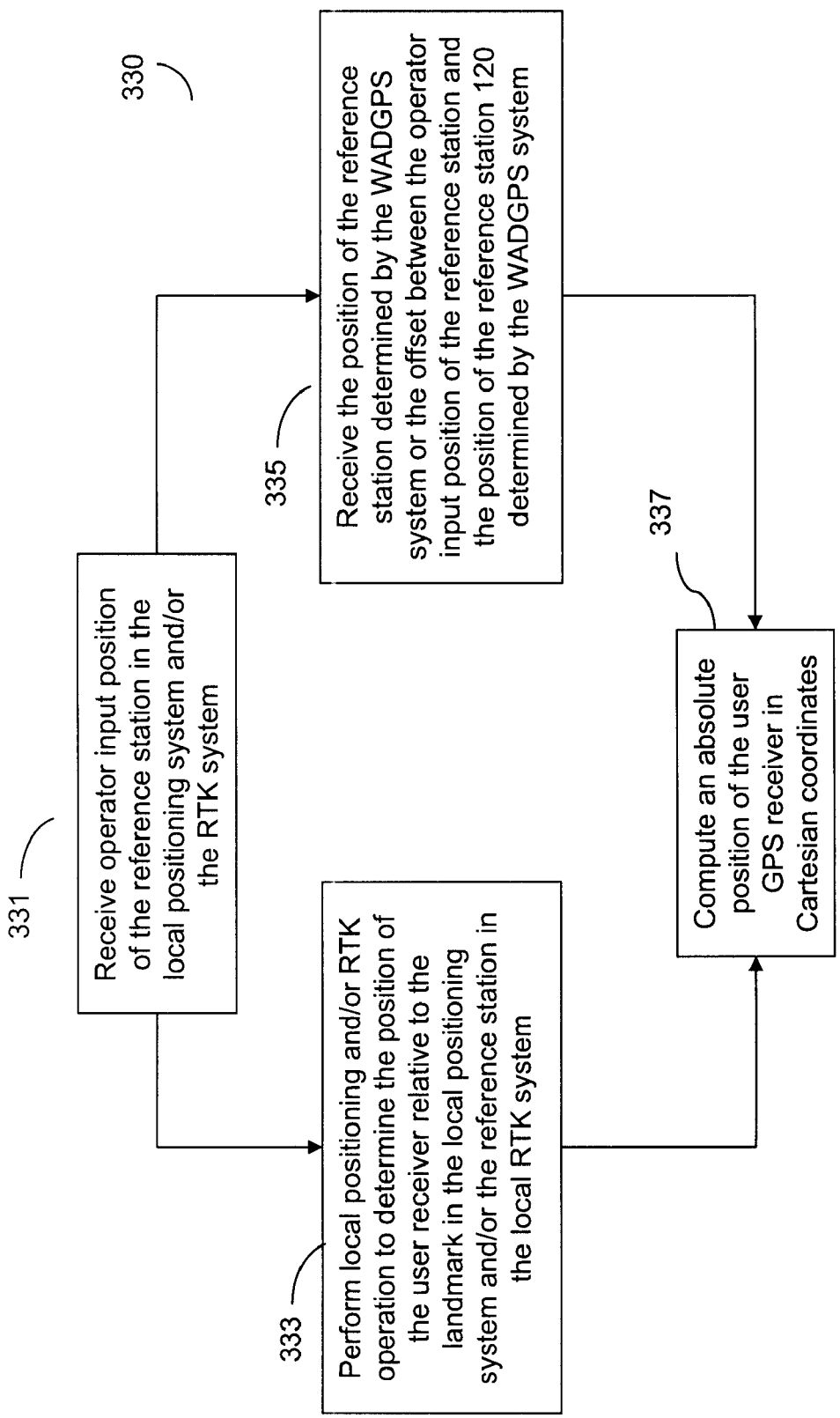
FIG. 3B is a flowchart illustrating a method for updating a receiver position using a local RTK system.

FIG. 3B illustrates in more detail step 330 in the method 300 in which the user position is updated using the local positioning system 174 and/or the local RTK system 150. As shown in FIG. 3B, step 330 includes a substep 331 in which the user or object 140 receives the operator input position of the reference station 120 in the local positioning system 174 and/or the RTK system 150, and a substep 333 in which the user or object 140 performs local positioning and/or local RTK operation to determine its own position relative to that of the one or more landmarks 176 and/or the reference station 120. Step 330 further includes a substep 335 in which the user or object 140 receives the more accurate position of the reference station 120 determined by the WADGPS system 100 or the offset between the operator input position of the reference station 120 and the more accurate position of the reference station 120 determined by the WADGPS system 100. Step 330 further includes a substep 337 in which the user or object 140 computes an absolute position of the user GPS receiver 142 in Cartesian coordinates using either the user input position of the landmark and/or reference station or the position of the one or more landmarks 176 and/or the reference station 120 determined by the WADGPS system 100 (if available).

An example where benefits could be obtained by using the method 300 is in positioning a train. When a train passes through a tunnel, the local positioning system link, the RTK link and the global WADGPS link would be lost. In this situation the local positioning system data link and/or the RTK data link can be set up to initialize the WADGPS floating ambiguity values as the train comes out of the tunnel. This would avoid the long data interval otherwise required to determine the correct floating ambiguity values.

Another example where benefits could be obtained by using the method 300 is in positioning an airplane right after take-off. In this case, a local positioning system and/or a local RTK system at an airport where a plane is preparing to take off can be used to initialize the WADGPS ambiguities either before or during the take-off.

Thus, the user or object 140, which includes the user GPS receiver 142 and the computer system 144 coupled to the user GPS receiver 142, can operate in both the local positioning mode, the RTK mode and/or the WADGPS mode. The local positioning system 174 and the local RTK system 150 are more favorable than the WADGPS system because the search process for local positioning system 174 and the local RTK system 150 as discussed above take much less time than the smoothing method in the WADGPS system 100 for resolving the integer ambiguity values. In the search process, the smoothing of the code measurements is either not required or a smoothing of the code measurements of much shorter duration is performed, not to determine the whole-cycle ambiguity directly, but to provide a decreased uncertainty in an initial set of integer ambiguity values so that the subsequent search process can be more tightly constrained. For that reason, only a few seconds of data is sufficient for obtaining the initial set of ambiguity values.

The local positioning system 174 and/or the local RTK system 150, however, are only available in situations where the communication link between the user GPS receiver 142 and the one or more landmarks 176 in the local positioning system 174 and/or the reference station 120 in the local RTK system 150 can be maintained and the user or object 140 does not wander too far from the one or more landmarks 176 in the local positioning system 174 and/or the reference station 120 in the local RTK system 150. When these conditions are not satisfied, that is, when the local positioning system 174 and/or the local RTK system 150 are either not available or inaccurate, the user can resort to the WADGPS system 100 for navigation by using the user receiver position last determined by the local positioning system 174 and/or the RTK system 150 to initialize the WADGPS system so that the long "pull-in" time to obtain the "floating ambiguity" values is avoided.

Figure 4A:
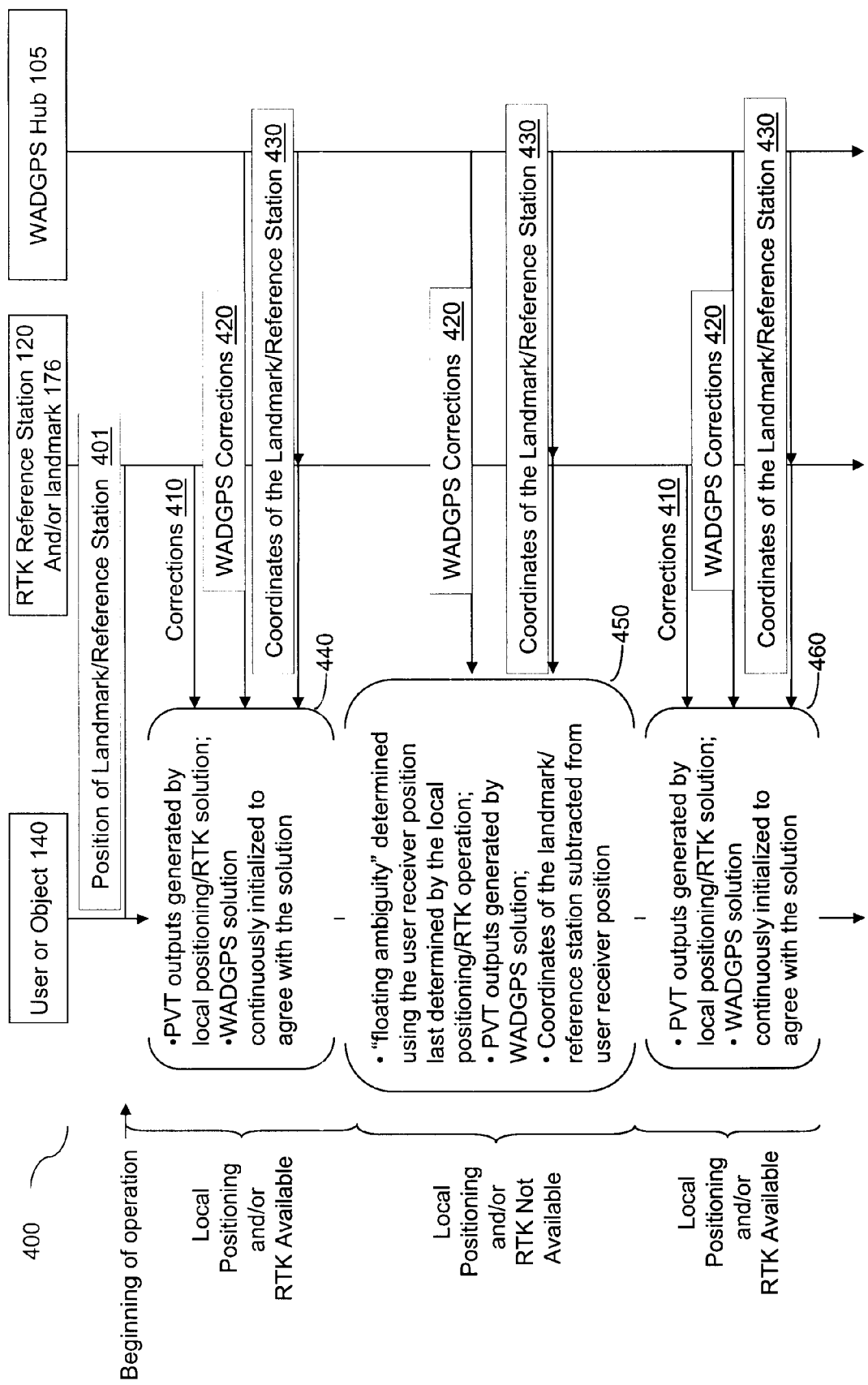
FIG. 4A is a flowchart illustrating a process flow for combined operation using both the WADGPS system and the local RTK system.

FIG. 4A illustrates a process flow 400 for a combined local positioning, RTK and WADGPS operation performed by the user computer system 144. The process flow includes steps 440, 450 and 460. As shown in FIG. 4A, while the local positioning corrections are available, the user 140 operates in the local positioning mode and while the RTK corrections are available, the user 140 operates in the RTK mode. The user 140 receives the position 401 of the landmark/reference station 120 in the local positioning system 174 and/or the local RTK system 150 and performs step 440 in which the user receiver's PVT are determined using the local positioning/RTK corrections 410 received from the landmark 176 in the local positioning system 174 and/or the reference receiver 120 in the local RTK system 150. During the performance of step 440, the user 140 may continue to receive the WADGPS corrections 420 from the hubs 105 so that WADGPS solutions can be generated in the background. The user 140 may also receive updated position 430 of the landmark 176 in the local positioning system 176 and/or the reference station 120 in the local RTK system 150 from the hub 105 at a relatively low rate. Using the updated position of the landmark 176 and/or the reference station 120 and the local positioning/RTK solutions of the user receiver position, the WADGPS solutions can be continuously initialized in the background to agree with the local positioning/RTK solutions, according to the method 300 discussed above.

When the local positioning and the RTK corrections are lost, the user 140 switches to the WADGPS mode of operation and performs step 450, in which the user 140 uses the user receiver position determined in the local positioning and/or the RTK mode of operation immediately before the local positioning/RTK corrections became unavailable to initialize the floating ambiguity values for the WADGPS mode of operation according to the method 300 discussed above. This way, the "floating ambiguity" values can be determined without the long "pull-in" time. During the performance of step 450, the user 140 continues to receive the WADGPS corrections 420 from the hubs 105. The user 140 may also receive the updated position 430 of the one or more landmarks 176 in the local positioning system 174 and/or the reference station 120 in the local RTK system 150 from the hub 105 at a relatively low rate. The reference station coordinates are used to transform the user receiver position generated in the WADGPS mode into position relative to the one or more landmarks 176 and/or the local reference receiver 120. This way the PVT results generated by the user computer system 144 will seamlessly transition between the different modes of operation.

When the local positioning and/or the RTK corrections are available again, the user resumes local positioning and/or RTK operation in step 460, which is similar to the local positioning and/or the RTK operation in step 440.

Figure 4B:
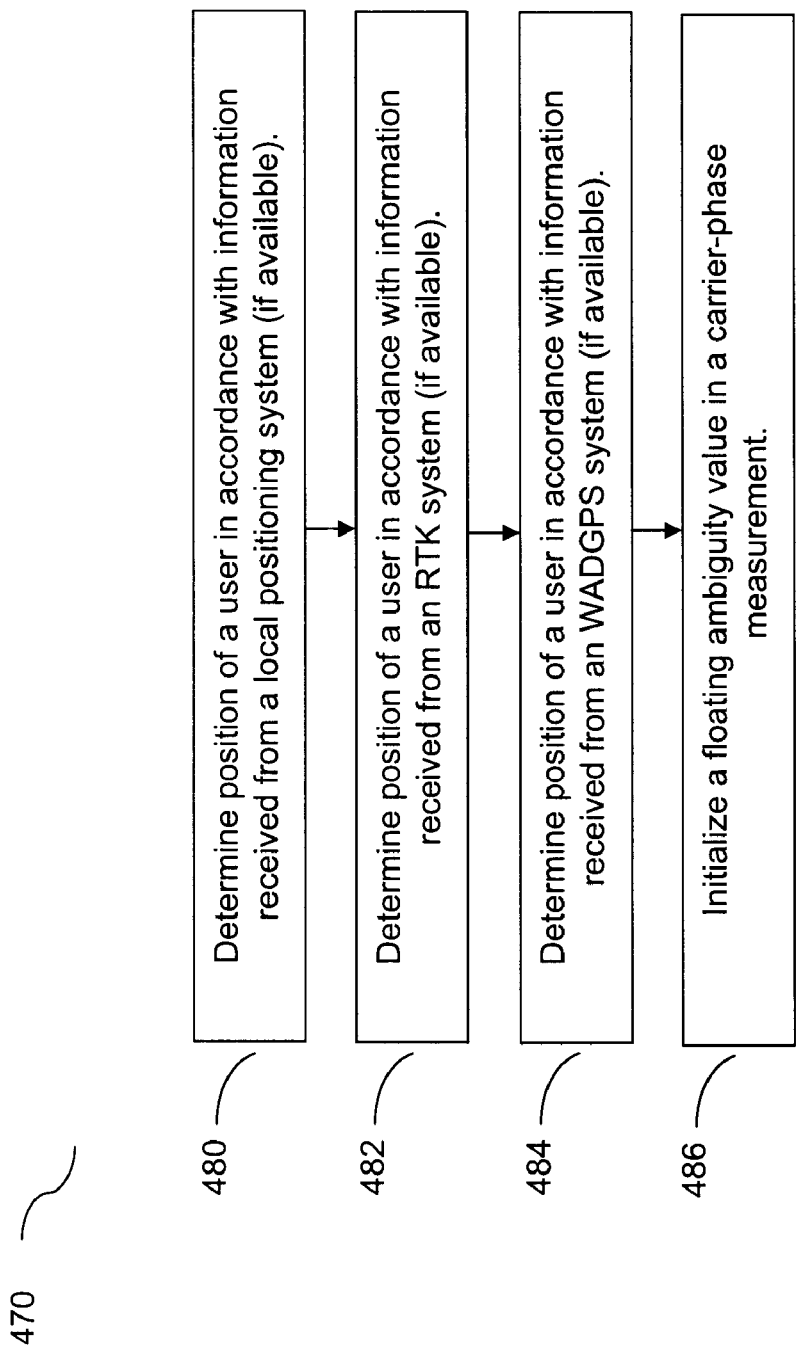
FIG. 4B is a flow chart illustrating a process flow for use of a local positioning system, a local RTK system, and/or a WADGPS system.

FIG. 4B is a flow chart illustrating a process flow 470 for use of a local positioning system, a local RTK system, and/or a WADGPS system. If available, a position of a user may be determined in accordance with information received from a local positioning system (480). If available, a position of a user may be determined in accordance with information received from an RTK system (482). If available, a position of a user may be determined in accordance with information received from a WADGPS system (484). A floating ambiguity value in a carrier-phase measurement may be initialized (486). The process 470 may include fewer or additional operations. Two or more operations may be combined and a position of at least one operation may be changed.

While navigation based on correction signals received from a local positioning or local RTK system (e.g., from a local reference station) is typically more accurate than navigation based on information received from a WADGPS system, multipath signals can adversely affect the accuracy of the correction information produced and transmitted by a reference station in a local positioning or local RTK system. Therefore, if the correction information produced by a local positioning or local RTK reference station has been degraded (by multipath signals or otherwise) by more than a threshold amount, it would desirable to detect that condition and navigate an object or user based on information from the WADGPS system. The process described below with reference to FIG. 4C increases the reliability of a multi-mode navigation system by detecting when the correction signals received from a local positioning or local RTK reference station are inaccurate. When that condition is detected, navigation of the object or user is based on information received from the WADGPS system. If the accuracy of the correction signals received from a local positioning or local RTK reference station thereafter improves, the process may transition to navigation using correction information received from the local positioning or local RTK system.

Figure 4C:
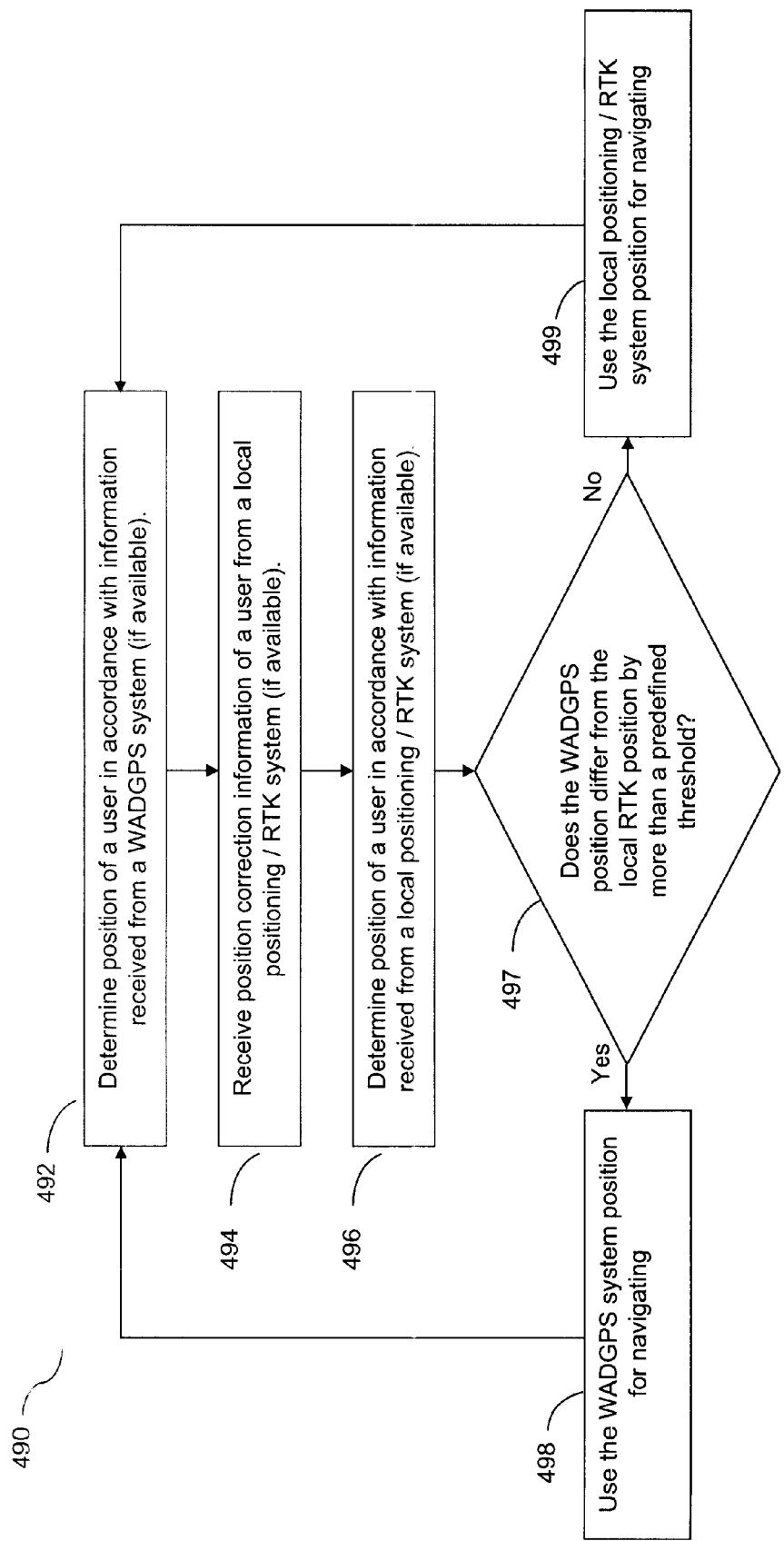
FIG. 4C is a flow chart illustrating a process flow for use of a WADGPS system with a local positioning system and/or a local RTK system.

FIG. 4C is a flow chart illustrating a process flow 490 for increasing the reliability of position information when transitioning from a WADGPS system to a local positioning/local RTK system. If available, a position (sometimes called the WADGPS position) of an object or user may be determined in accordance with information received from a WADGPS system (492). Navigation of the object or user using the WADGPS system may continue until communications are established (or re-established) with a reference station of the local positioning or local RTK system. If available, position correction information of a user may be received from a local positioning/local RTK system (494), and a position (sometimes called the local RTK position) of the object or user may be determined in accordance with the information received from the local positioning/local RTK system (496). If current values of both positions (of the same object or user) are available, the position of the object or user determined using information from the WADGPS system and the position of the object or user determined using information from the local positioning/local RTK system are compared (497). If the position of the object or user determined based on information from the WADGPS system differs from the position determined based on information from the local positioning/local RTK system by more than a predefined threshold, the position of a user determined by a WADGPS system is used for navigation (498). If the position of the object or user determined based on information from the WADGPS system differs from the position of the object or user determined using information from the local positioning/local RTK system by less than the predefined threshold, the position of the object or user that is based on the information from the local positioning/local RTK system is used for navigation (499).

In some embodiments, the predefined threshold is one or more fixed values. For example, in one embodiment the predefined threshold is a first value (e.g., 20 cm) for differences in vertical position, and a second value (e.g., 15 cm) for differences in horizontal position. If the WADGPS and local RTK positions differ in the vertical dimension by more than the first value or differ in the horizontal dimension by more than the second value, the position correction information from the local positioning/RTK system is rejected and the WADGPS position is used for navigation. In some other embodiments, the predefined threshold is determined using a chi-squared ratio test of covariance matrices of the first and second positions (the WADGPS position and local RTK position) of an object. The use of a chi-squared ratio test of covariance matrices is discussed in Satirapod C, Wang J and Rizos C., "*A Simplified MINQUE Procedure for the Estimation of Variance-Covariance Components of GPS Observables,*" Survey Review, vol. 36, no. 286, pp. 582-590, 2002; H. K. Lee, C. Rizos, and G. I. Jee, "*Design and Analysis of DGPS Filter with Consistent Error Covariance Information,*" SatNav 2003, 6th International Symposium on Satellite Navigation Technology Including Mobile Positioning & Location Services, Melbourne, Australia, 22 Jul. 2003; and H. K. Lee, C. Rizos, and G. I. Jee, "*Design of Kinematic DGPS Filters with Consistent Error Covariance Information,*" Radar, Sonar and Navigation, IEEE Proceedings, Vol. 151, Issue 6, pp. 382-388, 10 Dec. 2004, each of which is hereby incorporated by reference as background information.

In an exemplary embodiment, the user GPS receiver 142 may operate in a first mode of operation that uses the local positioning system 176 to determine a first position of the user 140 when communication with the local positioning system 176 is available. A second position of the user 140 may be determined in accordance with carrier-phase measurements performed using the WADGPS system 100 in a second mode of operation. A known position of the user 140, such as the first position, may be use to initialize a floating ambiguity value in the carrier-phase measurements. In some embodiments, the known position of the user 140 may be provided and/or input by the user.

In some embodiments, the first mode of operation is used to determine the user 140 position if it is available. If communication with the local positioning system 174 is lost, however, the second mode of operation may be used. Communication with the local positioning system 174 may be lost if a distance to the local position system 174 exceeds a value, such as 100 m, 500 m, 1000 m, 10,000 m or more.

In some embodiments, the first mode of operation and the second mode of operation may be performed substantially simultaneously and a difference between the first position and the second position is used to initialize the floating ambiguity value in the carrier-phase measurements. In some embodiments, the first mode of operation and the second mode of operation may be performed substantially simultaneously and a difference between the first position and the second position is used to determine a third position of the user 140. The third position of the user may be in accordance with information received from the local reference receiver 122 in the RTK system 150 in a third mode of operation.

In some embodiments, the third mode of operation may be used when communication with the local positioning system 174 is lost and the first mode of operation may be used when the communication with the local position system 174 is available again.

In some embodiments, the second mode of operation is used when communication with the local reference receiver 122 and the local positioning system 174 is lost, the first mode of operation is used when communication with the local positioning system 174 is available, and wherein the third mode of operation is used when the communication with the local reference receiver 122 is available and the communication with the local positioning system 174 is lost.

In some embodiments, the second mode of operation is used if a distance from the local positioning system 174 to the user 140 is greater than a first value (such as 10,000 m), the first mode of operation is used if the distance from the local positioning system 174 to the user 140 is less than a second value (such as 1000 m), and the third mode of operation is used if the distance from the local positioning system 174 to the user 140 is between the first pre-determined value and the second pre-determined value.

In some embodiments, the second mode of operation is used when the position determined by the second mode of operation and the position determined by the first mode of operation are compared and the position determined by the second mode of operation differs from the position determined by the first mode by more than a predefined threshold.

In some embodiments, the second mode of operation is used when the position determined by the second mode of operation and the position determined by the third mode of operation are compared and the position determined by the second mode of operation differs from the position determined by the third mode by more than a predefined threshold.

Figure 5:
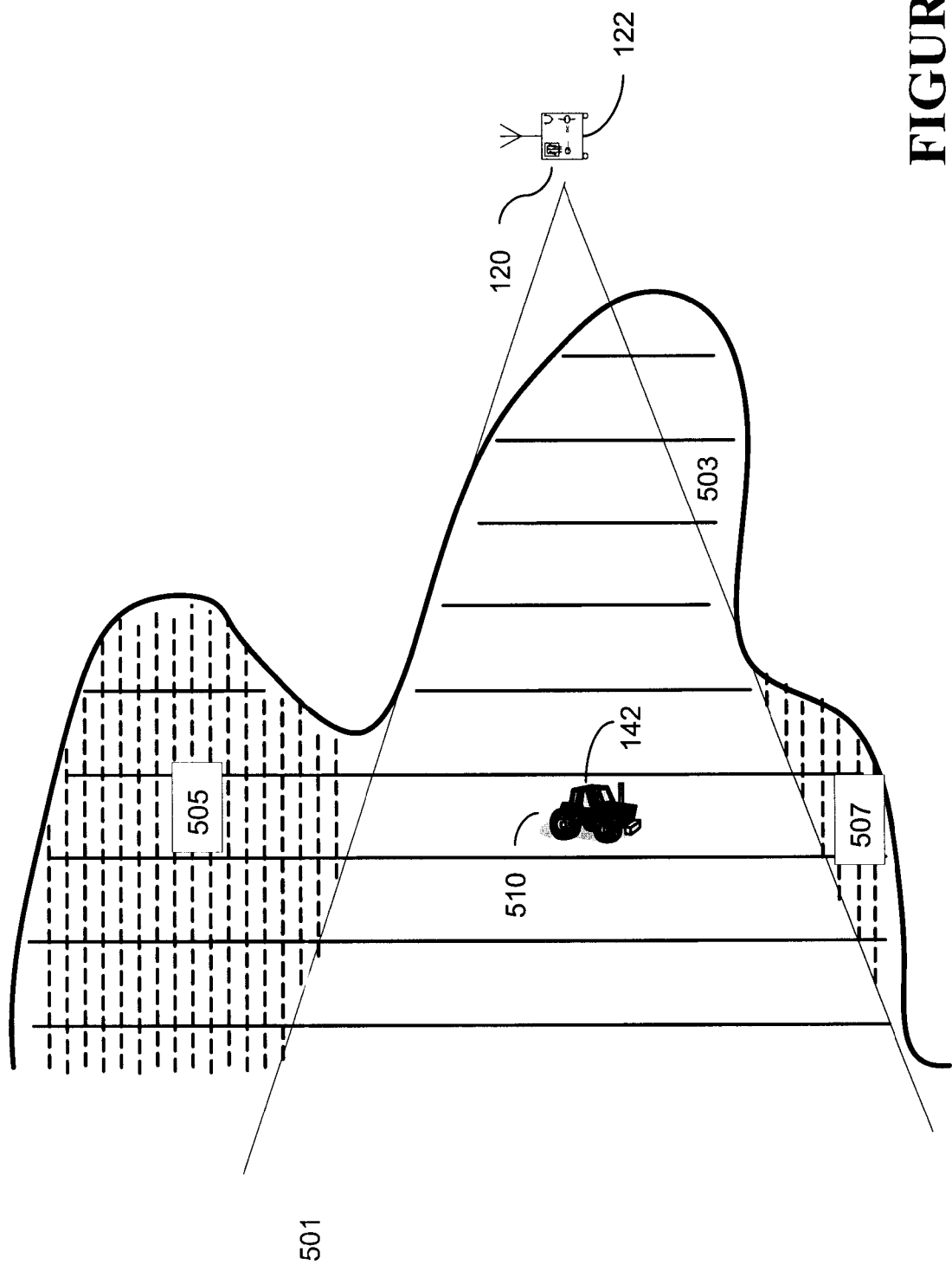
FIG. 5 is a diagram illustrating a situation in which the combined operation can be used.

The process 400 can be used in many applications. One application involves an extension of a local positioning system and/or an RTK operation into areas where a communication link with the local positioning system and/or the RTK radio link cannot be maintained, but where the WADGPS communication link is at least generally available. For example, as shown in FIG. 5, the user or object 140 may be a farming vehicle 510 moving in rows 520 in an area 501 of rolling hills, with the user receiver 142 attached to the farming vehicle or to a farming equipment that is connected to the farming vehicle. The area 501 includes area 503 that is visible from the reference station 120 in the local RTK system 150 and areas (shaded) 505 and 507 that are not visible from the reference station 120. Because the RTK communication link is usually line of site, the RTK data would be lost whenever the user GPS receiver 142 is moved from area 503 to area 505 or 507. But the data link between the user receiver 142 and the WADGPS system 100 is generally available because it is often facilitated by satellites. By initializing the floating ambiguities in the WADGPS system 100 whenever the RTK radio link is available and the RTK system 150 is operational, the accuracy of the RTK operation can be practically preserved during those intervals when the RTK link is lost.

While the WADGPS system 100 in FIG. 1 has been used in the above description, it will be appreciated that any regional, wide area, or global system which makes use of carrier-phase measurements from satellites for positioning and/or navigation purposes and thus requires determining ambiguity values associated with the phase measurements can also benefit by the method 300 and process 400 described above. Examples of these systems include the Starfire™ System developed by John Deere Company, and the regional High Accuracy-National Differential (HA-ND) GPS system being developed by several U.S. government agencies.

We claim:

1. A method for positioning or navigating an object using both a wide-area differential satellite positioning system and a local positioning system, the method comprising:

determining a first position of the object based on correction information from the wide-area differential satellite positioning system;

receiving position correction information from a base station of the local positioning system, and determining a second position of the object based on the correction information received from the base station of the local positioning system;

comparing the first position and second position; and using the first position for navigating the object when the first position and second position differ by more than a predefined threshold, and using the second position for navigating the object when the first position and second position differ by less than the predefined threshold.

2. The method of claim 1, wherein the predefined threshold is determined using a chi-squared ratio test of covariance matrices of the first and second positions of an object.

3. The method of claim 1, wherein the predefined threshold is a value between 15 and 20 centimeters with respect to a predefined direction.

4. The method of claim 1, wherein the local positioning system is a local real-time kinematic (RTK) positioning system.

5. The method of claim 1, including transitioning from navigating the object using the local positioning system to navigating the object using the wide-area differential satellite positioning system upon detecting loss of communication with the base station of the local positioning system.

6. The method of claim 5, including transitioning from navigating the object using the wide-area differential satellite positioning system to navigating the object using the local positioning system upon detecting re-acquisition of communication with the base station of the local positioning system and determining that the first position and second position differ by less than the predefined threshold.

7. The method of claim 1, wherein determining the first position includes receiving the correction information from the wide-area differential satellite positioning system.

8. A computer readable medium storing therein computer readable program instructions that, when executed by a processor, cause the processor to perform a method for positioning or navigating an object using both a wide-area differential satellite positioning system and a local positioning system, the program instructions comprising:
    instructions for determining a first position of the object based on correction information from a wide-area differential satellite positioning system;
    instructions for receiving position correction information from a base station of the local positioning system, and determining a second position of the object based on the correction information received from the base station of the local positioning system;
    instructions for comparing the first position and second position; and
    instructions for using the first position for navigating the object when the first position and second position differ by more than a predefined threshold, and for using the second position for navigating the object when the first position and second position differ by less than the predefined threshold.

9. The computer readable medium of claim 8, wherein the predefined threshold is determined using a chi-squared ratio test of covariance matrices of the first and second positions of an object.

10. The computer readable medium of claim 8, wherein the predefined threshold is a value between 15 and 20 centimeters with respect to a predefined direction.

11. The computer readable medium of claim 8, wherein the local positioning system is a local real-time kinematic (RTK) positioning system.

12. The computer readable medium of claim 8, wherein the program instructions further comprise instructions for transitioning from navigating the object using the local positioning system to navigating the object using the wide-area differential satellite positioning system upon detecting loss of communication with the base station of the local positioning system.

13. The computer readable medium of claim 12, wherein the program instructions further comprise instructions for transitioning from navigating the object using the wide-area differential satellite positioning system to navigating the object using the local positioning system upon detecting re-acquisition of communication with the base station of the local positioning system and determining that the first position and second position differ by less than the predefined threshold.

14. The computer readable medium of claim 8, including instructions for receiving the correction information from the wide-area differential satellite positioning system.

15. A satellite navigation receiver for positioning or navigating an object using both a wide-area differential satellite positioning system and a local positioning system, comprising:
    a memory;
    a satellite signal receiver;
    at least one auxiliary receiver for receiving position correction information from wide-area differential satellite positioning system and the local positioning system;
    a processor; and
    at least one program, stored in the memory and executed by the processor, the program including:
    instructions for determining a first position of the object based on correction information from the wide-area differential satellite positioning system;
    instructions for receiving position correction information from a base station of the local positioning system, and determining a second position of the object based on the correction information received from the base station of the local positioning system;
    instructions for comparing the first position and second position; and
    instructions for using the first position for navigating the object when the first position and second position differ by more than a predefined threshold, and for using the second position for navigating the object when the first position and second position differ by less than the predefined threshold.

16. The satellite receiver of claim 15, wherein the predefined threshold is determined using a chi-squared ratio test of covariance matrices of the first and second positions of an object.

17. The satellite receiver of claim 15, wherein the predefined threshold is a value between 15 and 20 centimeters with respect to a predefined direction.

18. The satellite receiver of claim 15, wherein the local positioning system is a local real-time kinematic (RTK) positioning system.

19. The satellite receiver of claim 15, wherein the receiver transitions from navigating the object using the local positioning system to navigating the object using the wide-area differential satellite positioning system upon detecting loss of communication with the base station of the local positioning system.

20. The satellite receiver of claim 19, wherein the receiver transitions from navigating the object using the wide-area differential satellite positioning system to navigating the object using the local positioning system upon detecting re-acquisition of communication with the base station of the local positioning system and determining that the first position and second position differ by less than the predefined threshold.

21. The satellite receiver of claim 15, including instructions for receiving the correction information from the wide-area differential satellite positioning system.

22. A satellite navigation receiver for positioning or navigating an object using both a wide-area differential satellite positioning system and a local positioning system, wherein the satellite navigation receiver:
  determines a first position of the object based on correction from the wide-area differential satellite positioning system;
  receives position correction information from a base station of the local positioning system, and determining a second position of the object based on the correction information received from the base station of the local positioning system;
  compares the first position and second position; and
  uses the first position for navigating the object when the first position and second position differ by more than a predefined threshold, and uses the second position for navigating the object when the first position and second position differ by less than the predefined threshold.

* * * * *